May 12, 1942.  W. F. SCHULTZ  2,282,497
FLOAT CONTROLLED METER
Filed May 28, 1941   3 Sheets-Sheet 1
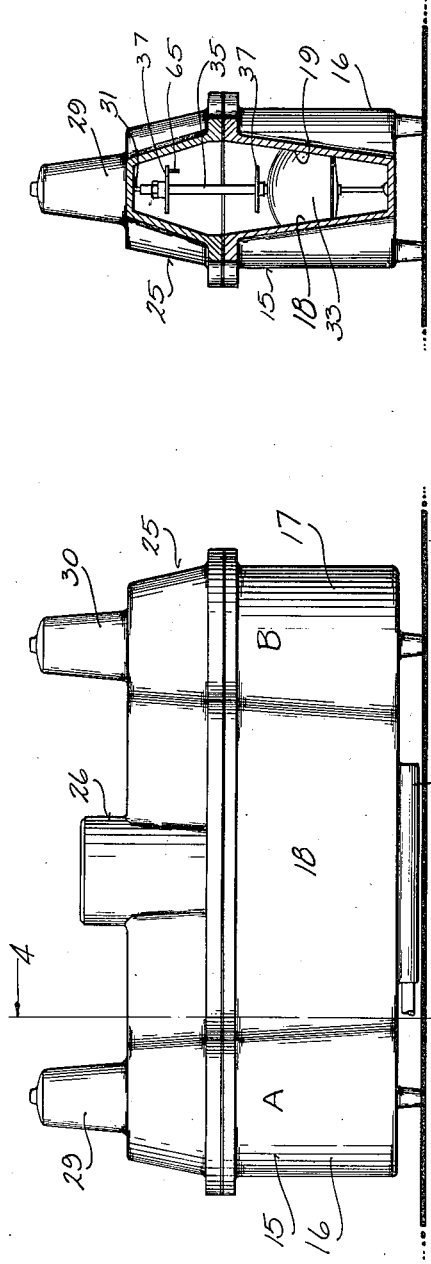
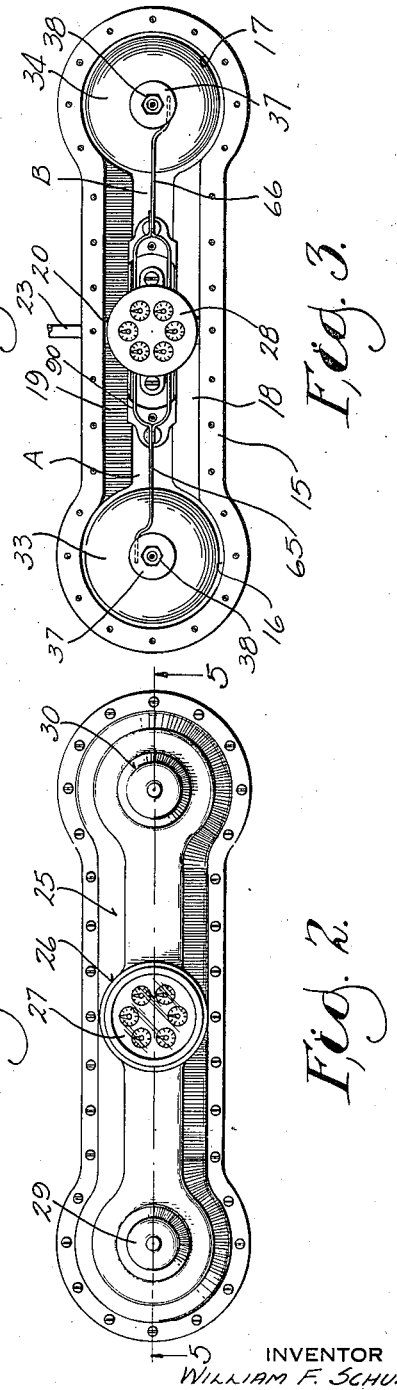
INVENTOR
WILLIAM F. SCHULTZ
BY
Wheeler, Wheeler & Wheeler
ATTORNEYS.

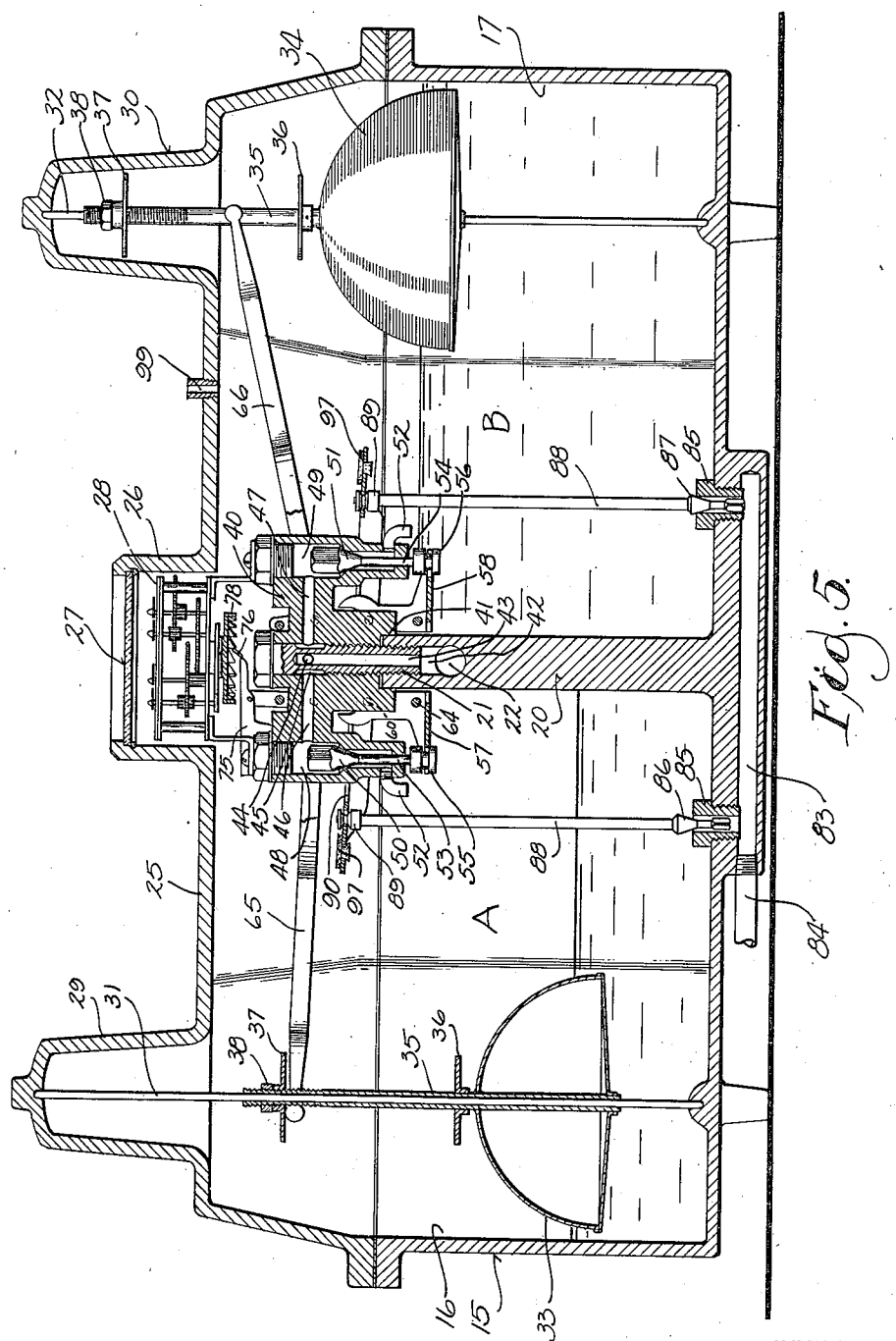

May 12, 1942.　　　W. F. SCHULTZ　　　2,282,497
FLOAT CONTROLLED METER
Filed May 28, 1941　　　3 Sheets-Sheet 3
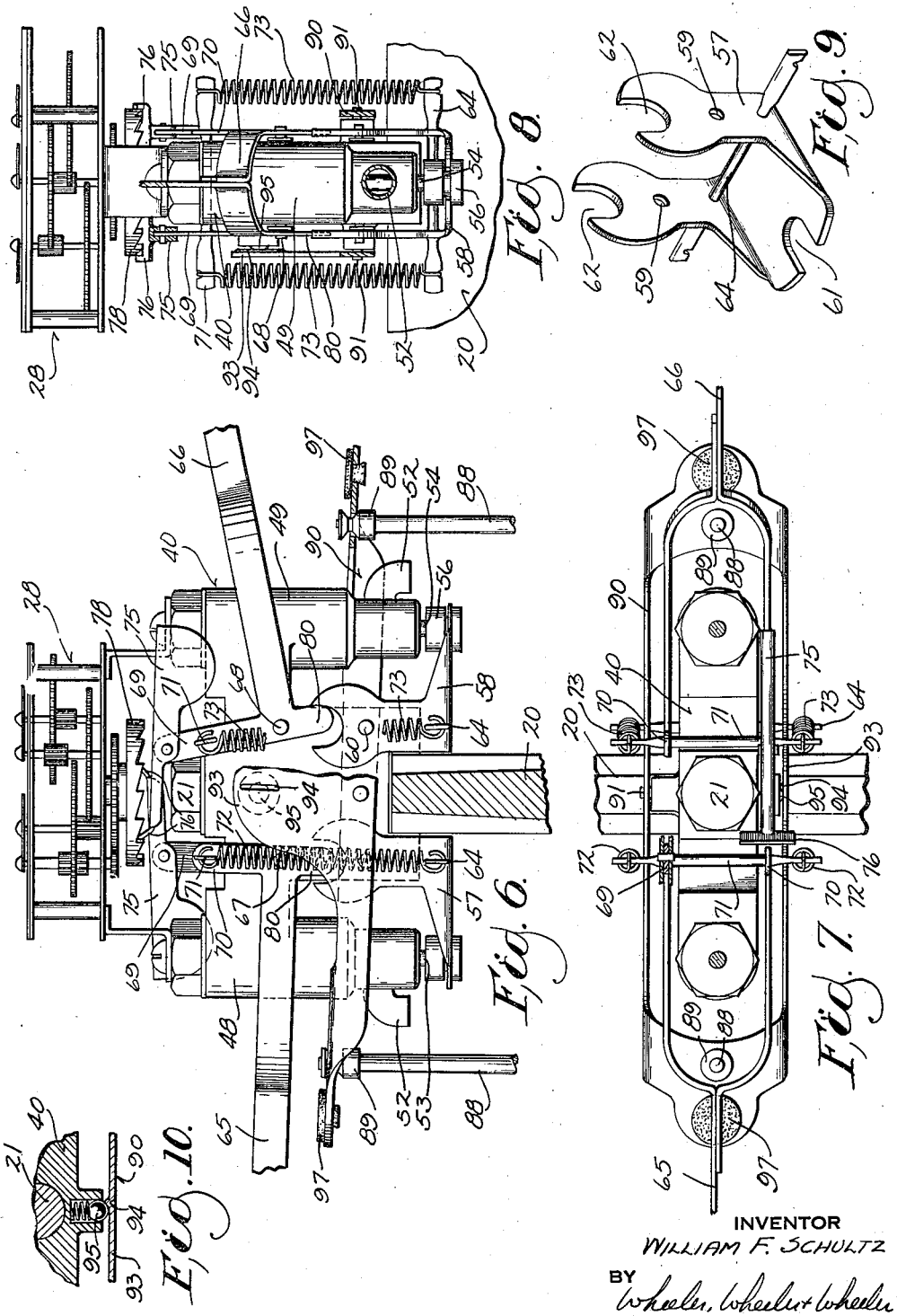

Patented May 12, 1942

2,282,497

UNITED STATES PATENT OFFICE 2,282,497

FLOAT CONTROLLED METER

William F. Schultz, Ripon, Wis.

Application May 28, 1941, Serial No. 395,601

15 Claims. (Cl. 73—221)

This invention relates to improvements in float controlled meters. The device herein disclosed is an improvement upon the invention disclosed in my Patent No. 2,202,606 granted May 28, 1940.

Some of the objects of the present invention are to simplify a device of this character, to reduce the cost of manufacture thereof, and at the same time to increase its accuracy.

In accomplishing these objectives it is my purpose to unify the valve and control structure in such fashion that substantially the entire mechanism is mounted by a single bolt on the partition between the two metering chambers. It is my further purpose to provide a novel and improved casing structure and control mechanism peculiarly designed and adapted to effectuate the purposes of this invention, with particular reference to the elimination of friction as a source of inaccuracy in a meter of this type. It is my further purpose to provide a mechanism which is direct acting in the sense that the parts do not require to be latched and unlatched with respect to each other as was the case in my former meter construction.

Other objects of the invention will appear in more detail from the following disclosure.

In the drawings:

Fig. 1 is a front elevation of a meter embodying the invention.

Fig. 2 is a plan view thereof.

Fig. 3 is a plan view of the meter with its cover removed.

Fig. 4 is a view taken in section on line 4—4 of Fig. 1.

Fig. 5 is an enlarged detail view taken in section on the line 5—5 of Fig. 2.

Fig. 6 is an enlarged detail view in front elevation of the operating and control unit, portions of the mechanism being broken away to expose portions at the rear.

Fig. 7 is a plan view of the unit shown in Fig. 6.

Fig. 8 is a view of the control unit in end elevation.

Fig. 9 is a detail view showing in perspective one of the peculiarly formed levers preferred for use in the control unit of Fig. 6.

Fig. 10 is a fragmentary detail view in horizontal section showing a snap action mechanism employed for controlling the operation of the outlet valve control lever.

Like parts are identified by the same reference characters throughout the several views.

The casing shown in Figs. 1 to 4 inclusive is of novel form specifically adapted to promote the proper functioning of a meter of the character hereinafter to be described. The casing proper or base 15 has the shape of a dumb-bell in plan, as clearly appears from Figs. 2 and 3. At its respective ends it is provided with generally cylindrical portions 16 and 17 between which the front and rear walls 18 and 19 are relatively close together and preferably disposed in downwardly converging planes as clearly appears from Fig. 3 and Fig. 4.

Substantially at the mid point a partition 20 connects walls 18 and 19, thus dividing the casing 15 into two like chambers marked A and B respectively in Figs. 1, 3 and 5. As best shown in Fig. 5, the control mechanism hereinafter to be described is mounted directly upon the partition 20 by means of tubular bolt 21, the interior of which communicates with an inlet conduit at 22 supplied from the rear by the feed line 23 (Fig. 3).

The lower or base portion 15 which comprises the meter casing proper, is hermetically sealed by a top closure 25 of corresponding shape in plan, as best appears upon comparison of Figs. 2 and 3. Centrally the top closure 25 is provided with an integral upstanding sleeve at 26 provided at its upper end with a glass window 27 through which the dials of the register mechanism 28 are visible. As best shown in Fig. 5, the register is mounted on brackets carried by plugs which constitute closures for the valve chambers hereinafter to be described. Centrally over each of the generally cylindrical portions 16 and 17 of the chambers A and B the top closure 25 is provided with bell-shaped upward extensions at 29 and 30, centrally socketed to receive the guide rods 31 and 32 respectively, upon which the floats 33 and 34 are guided for vertical reciprocation in their respective chambers A and B.

Except for bottom surfaces which are slightly frusto-conical, the floats 33 and 34 are preferably semi-spherical in form. To assure positive response to any change of liquid level, the floats are relatively large in diameter. The cylindrical form of portions 16 and 17 of the chambers A and B accommodates these relatively large sized floats, while the more constricted passage between the front and rear walls 18 and 19 of the casing prevents the capacity of the respective chambers from being too large (as would be the case if each chamber were, throughout its length, of the same width as the cylindrical portion in which the respective float is located). At their lower ends the guide rods 31 and 32 are seated in socketed bosses formed integrally in the bottoms of the respective chambers.

The floats 33 and 34 are not directly reciprocable upon the guide rods but, instead, are preferably mounted upon sleeves 35 which are not only vertically reciprocable but also rotatable upon the respective guide rods. The rotation is important as a means of avoiding friction, as will hereinafter be explained. Each of the sleeves 35 has, adjacent its float, a relatively fixed collar at 36. At a point remote from the float it is provided with screw threads upon which another collar 37 is adjustable, being held in adjustment by lock nut 38.

The main control unit comprises a casting 40. It serves as a mount or support for the inlet valve mechanism and the several control levers, as well as the register 28. The casting 40 is notched at 41 to seat on the upper margin of the partition 20 where, as previously stated, it is retained by a single bolt 21 screw threaded into an opening 42 which communicates with the liquid inlet conduit 22. The bolt is tubular for a considerable part of its length, having an axial bore at 43 leading to a cross bore 44 which opens into an annular groove at 45 through which liquid admitted through the supply pipe 23 may reach the distributing ducts 46 and 47 which lead to the respective valve chambers 48 and 49. A closure plug seals each of these chambers at its top.

At the bottom of each chamber is a valve seat normally closed by the respective inlet valves 50 and 51. Below each valve a discharge spout 52 opens into the respective liquid chambers A and B. The valve stems 53 and 54 of valves 50 and 51 respectively, are guided in the bottom of the frame or casting 40 and project therebeyond, and are terminally provided with control spools 55 and 56 respectively.

Loosely engaging each of the control spools is a notched bell crank lever, preferably of the form separately illustrated in Fig. 9. Bell crank 57 is engaged with control spool 55, while bell crank 58 is engaged with control spool 56 of valve 51. Each of the bell crank levers is preferably of channel shape, its respective sides being apertured at 59 for engagement over the pivot pins projecting laterally from the casing as indicated at 60 in Fig. 6. The notch 61 of each lever engages its respective control spool. The upper ends of the respective sides of the lever are further notched at 62, the duplex arrangement being used primarily to equalize the stress and avoid distortion such as might introduce friction into the functioning of the mechanism. Extending transversely through the respective arms of the duplex bell crank lever is an anchor rod 64 to which snap action tension springs are connected as hereinafter to be discribed.

Projecting across the respective chambers A and B are the arms 65 and 66 of float actuated bell crank levers pivoted at 67 and 68 to the casting 40 which serves as a frame for the control mechanism. Each of the bell crank levers 65 and 66 is preferably bifurcated to pass on both sides of the frame casting 40 in the manner clearly shown in Figs. 3, 6 and 7, the objective again being to equalize stresses and avoid friction.

At each side of the frame casting 40, each of the levers 65 and 66 has arms projecting upwardly from its pivot pin, there preferably being a relatively long arm 69 and a shorter arm at 70 as best shown in Fig. 6. Both arms are provided with cross rods 71 serving as anchorages for the tension springs 72 and 73 respectively, there being two springs 72 at the opposite sides of the frame casting 40 connecting the arms 69 and 70 of bell crank lever 65 with the underlying bell crank lever 57. Likewise at each side of the frame casting is the spring 73 connecting the upwardly projecting arms 69 and 70 of bell crank lever 66 with the underlying bell crank lever 58. In each instance the longer arms 69, respectively located at opposite sides of the frame casting 40, carry pawls 75 which are pivoted to the respective arms and provided with chisel-shaped terminal teeth 76 (Fig. 7) for engagement with the ratchet crown gear 78 (Fig. 6 and Fig. 8). The pawls are so formed as to be self-biasing toward operative engagement of their respective teeth 76 with successive ratchet teeth of the ratchet gear 78, the latter being connected to the gear train of any suitable register such as that indicated generically at 28.

Each of the bell crank levers 65, 66 has, at each side of the frame casting 40, a downwardly projecting finger 80 loosely engaged in the adjacent notch 62 of the adjacent arm of the bell crank 58 or 57, as the case may be (Fig. 6). The loose fit of finger 80 in notch 62 allows considerable freedom of relative movement between the bell crank lever 65 or 66, actuated by the float, and the bell crank 57 or 58, which operates one or another of the inlet valves.

As above indicated, pairs of springs 73 at opposite sides of the frame casting 40 connect the anchorage rod 71 of the bell crank lever 66 with the anchorage rod 64 of the bell crank 58. Interacting portions of the two bell cranks constitute, in effect, a very loosely jointed toggle lever arrangement such that as the float operates lever 66 in one direction or the other, the springs are ultimately caused to cross a center line and thereby to subject both of the bell cranks to snap action tending to advance with overrun the bell crank lever 66 in the direction in which it was being actuated by the float and at the same time tending to snap the associated inlet valve either open or closed, as the case may be.

An outlet chamber is provided at 83 (Fig. 5) in the bottom of the casting which forms the metering chambers A and B respectively. From the outlet chamber a pipe 84 leads to the point at which the liquid metered is to be used. Screw threaded into the bottoms of the respective metering chambers A and B, preferably in the restricted portions thereof near the partition, are the valve seat fittings 85 through which liquid is drained from the metering chambers to the outlet chamber when the respective control valves are open.

The outlet valves 86 and 87 respectively are identical, each being provided with a stem 88 extending to a point above the chamber casting 15 and there provided with a control spool at 89. The respective control spools are loosely engaged by the outlet valve actuating lever 90 which is pivoted at 91 to the frame casting 40 (Figs. 6, 7 and 8), the lever 90 being provided with a center opening sufficiently large to clear the casting 40 entirely and to pass along opposite sides thereof, as best indicated in Fig. 7 and Fig. 8.

At the front side of the frame casting 40 the lever 90 which interconnects the stems 88 of the outlet valves 86 and 87, is provided with an upstanding arm 93 in which there is pressed an inwardly directed rib at 94 coacting with a spring pressed ball 95 socketed in the frame casting 40 to offer a certain amount of resistance to the pivotal movement of lever 90 until sufficient energy has been stored to force the ball aside, whereupon it permits the snap action movement of the lever to open one of the discharge valves, simultaneously closing the other. In practice this happens virtually instantaneously, since the discharge valves are not directly float actuated but are actuated by the impact of one of the bell crank levers 65 or 66. Reference has already been made to the fact that these bell crank levers are, themselves, movable with snap action when the respective springs 72 or 73 cross center, thereby causing the associated lever to overrun the control disk 37 of the float, by which it is being downwardly moved. When such overrun occurs, the lever 65 or 66 strikes a pad 97 at the end of the lever 90, the resulting impact producing an immediate oscillation of lever 90 to shift or reverse the positions of the discharge valves.

The operation of the device is as follows:

Throughout the drawings the parts are illustrated in the same relative positions in which they appear in Fig. 5, chamber A being in process of being drained and chamber B having already been filled.

Starting at this point, the successive positions of the parts in the course of a complete cycle may conveniently be shown in the following table:

1. A draining        B full
   Inlet closed      Inlet closed
   Outlet open       Outlet closed
2. A empty           B full
   Inlet opens       Inlet closed
   Outlet closes     Outlet open
3. A full            B draining
   Inlet closes      Inlet closed
   Outlet closed     Outlet open
4. A full            B empty
   Inlet closed      Inlet opens
   Outlet opens      Outlet closes As the liquid needed by the device is withdrawn through pipe 84, the level of liquid in chamber A will gradually fall, thus lowering float 33, the downward movement of the float being communicated by collar 37 to bell crank lever 65.

Reference has already been made to the fact that the specific construction of the device is calculated to improve its accuracy of performance by elimination of friction. It will be noted, by reference to Fig. 3, that the end of each of the levers 65 and 66 is offset to engage collars 36 and 37 laterally adjacent the rods 31 and 32 on which the float assemblies are reciprocable. As the bell crank levers oscillate about their respective fulcrums, the relative movement between the ends of these levers and the respective collars is accommodated by a bodily rotation of the respective float assemblies upon their respective guide rods. It has been found that this results in greatly improved accuracy as compared with any organization in which the end of the lever would be obliged to scrape frictionally across the collar, as would be the case if the arrangement did not permit the free rotation of the float assembly to eliminate this source of frictional resistance.

In the positions in which the parts are illustrated in Figs. 5 and 6 the float assembly has already somewhat lowered the bell crank lever 65 from its initial position. It will be noted that the downwardly projecting finger 80 of the bell crank lever is substantially centered in the notch 62 of the lower bell crank lever 57 which actuates inlet valve 55.

In the continued draining of chamber A float 33 will reach its lowermost operative position in such chamber (at which position the chamber will be assumed to be empty, even though it may have some residuum of liquid therein). In the assumed lowermost position of the float the bell crank lever 65 will be oscillated to a position where its fingers 80 engaging the right hand margin of the notches 62 in lever 57 will result in moving springs 72 across the center lines of the respective pivots of bell cranks 65 and 57 with the result that both levers will be sharply actuated by the tension of springs 72 to the second position shown in the above chart. Bell crank lever 65 will be oscillated counter-clockwise downwardly so that its end will leave the collar 37 from which it has received actuating pressure. In its sharp downward movement, impelled by springs 72, the lever 65 will strike the pad 97 and the resulting impact will sharply rock lever 90 to close outlet valve 86 of chamber A and open outlet valve 87 of chamber B.

Simultaneously, the bell crank lever 57 will be sharply actuated by springs 67 in a clockwise direction to open inlet valve 50, thus permitting immediate commencement of the operation of filling chamber A.

The filling of chamber A is entirely independent of the draining of chamber B. Assuming the device to be connected to an oil burner or the like, the draining of chamber B may take hours or days. In the meantime chamber A will be refilled in a few moments to make its contents available whenever chamber B may be drained.

As chamber A becomes filled, the float 33 will rise therein and the collar 36 of the float assembly will ultimately engage the end of bell crank lever 65 to elevate the bell crank lever toward its extreme upper position (a position corresponding to that in which bell crank lever 66 is illustrated in the drawings). Shortly after the bell crank lever passes the position in which it is illustrated in Figs. 5 and 6, but moving, this time, in an upward or clockwise direction, the tension springs 72 will again be swung across center, with the result that the lever 65 will move sharply upwardly to its extreme position, leaving collar 36, in so doing. The movement of the bell crank lever in a clockwise direction to its extreme position actuates the register mechanism to show the amount of liquid just admitted to chamber A, motion being communicated to the register mechanism through the upwardly extending arm 69 of the bell crank lever and the pawl 75 which is pivoted to the upper end of the arm and so weighted by its own form that its chisel tooth 76 is held against the ratchet 78 to advance this ratchet one tooth each time the lever 65 moves upwardly in a clockwise direction.

Meantime there is a concurrent counter-clockwise movement induced by tension springs 72 in the lower bell crank lever 57 which results in the snap closing of the inlet valve 50. The closing of the valve results, with precision, when a specified quantity of liquid has been delivered into the chamber from the supply pipe 23 through the passage 22, the duct 43, the cross bore 44, the duct 46, the valve chamber 48, and the pipe 52. In practice, calibration of the device might be achieved by the adjustment of collar 36 to regulate the top level of liquid in the chamber, but it has been found equally satisfactory to adjust the more readily accessible collar 37 to determine the bottom level of liquid in the chamber.

As above noted, the filling and the control of the filling of one chamber is entirely independent of the draining of the other.

The closing of discharge valve 86 of chamber A, and the opening of the corresponding discharge valve 87 of chamber B, place the contents of the latter chamber in communication with the discharge manifold at 83, which is never without a supply of liquid. Withdrawals through the pipe 84 will therefore come from chamber B from the moment that valve 86 closes and the filling of chamber A commences.

As the contents of chamber B become exhausted, the adjustable collar 37 on the float valve assembly engages lever 66 and begins to oscillate such lever clockwise as viewed in Figs. 5 and 6. As in chamber A, the float valve assembly rotates on the guide rod 32 to eliminate friction between the lever and the collar.

Ultimately the float reaches its lowermost position where, as in chamber A, the lever 66 has moved angularly to a point such that the springs 73 have snapped across center, thereby causing lever 66 to leave collar 37 and advance sharply in a clockwise direction, striking the underlying pad 97 to oscillate lever 90 clockwise, thereby closing exhaust valve 87 in chamber B to simultaneously open exhaust valve 86 in chamber A. Substantially in the same instant of time the bell crank 58 has oscillated counter-clockwise to open the inlet valve 51.

All liquid supplied to the discharge line will now come from tank A. In the meantime the fresh supply of liquid will advance into chamber B from the supply pipe 23 through the passage 22 in the collar and through the bore 43 of the bolt 41. Thus, in chamber B, as in chamber A, the same operation which closes the discharge valve in either chamber effects the opening of the inlet valve to such chamber. However, in each case, the closing of the inlet valve is independent of any other operation except the actuation of the register. As the float 34 rises with the rising level of liquid admitted to chamber B, the collar 36 which moves with the float mechanism raises bell crank lever 66 counter-clockwise until it reaches a point where the springs 73 cause its continued movement with a snap action, at the same time oscillating bell crank 58 in a valve closing direction. The snap action with which lever 66 is advanced away from collar 36 to the position shown in Fig. 5 causes its pawl 75 (Fig. 6) to operate on the ratchet 78 of the register to show that another chamber full of liquid has been metered into the apparatus. The maximum liquid level is preferably below the tops of valve stems 88.

The sequence of valve operations is similar in principle to that involved in the meter of my Patent 2,202,606 but the structure herein disclosed is greatly simplified and greatly improved in accuracy as compared with the structure disclosed in that patent.

The space within the meter casing 15 and its closure 25 may, if desired, be vented at 99, as the liquid does not rise above the top of partition 20 in this type of meter.

Accuracy of the meter is enhanced not only by the relative simplicity and direct action of the control mechanism and by the elimination of friction, but also by the proportionately very large floats which substantially fill the enlarged terminal portions of the respective metering chambers and are located at a considerable distance from the unitary control set mounted above the partition. The construction of the chambers adjacent the partition further contributes to accuracy of response since a very large proportion of the liquid admitted to each chamber is directly operable upon the float despite the relatively distant location of the float from the control set. Thus, not only is the float large but, due to its distance from the control set, it has considerable moment in acting upon the elongated arms 65 and 66.

I claim:

1. A meter comprising the combination with a casing provided with metering chambers and an intervening partition having an inlet duct, of means mounted on said partition provided with inlet valve ports, seats, valves and conduits communicating with the respective chambers, and a securing device connecting said means unitarily to said partition and comprising a tube affording communication between the inlet duct and the conduits leading to the respective ports and seats.

2. In a meter, the combination with a chambered casing provided with a partition having an inlet duct, of a valve frame assembly mounted on the partition and provided with discharge conduits leading respectively to opposite sides of the partition and provided internally with seats and valves for controlling discharge, a tubular bolt connecting said frame with said partition and affording communication between the partition duct and said conduits for the delivery of liquid from said duct to either side of the partition subject to the control of said valves, and valve control means mounted on said frame.

3. The device of claim 2 in combination with discharge valves operatively controlling outflow from the chambers of the casing at either side of the partition, and mechanism whereby said discharge valves are operatively connected with control mechanism mounted upon said frame.

4. In a meter, the combination with casing means providing casing chambers provided with discharge ports and adjacent seats, of valves operatively associated with the respective seats and having stems extending above maximum liquid levels in the respective chambers, a lever to which said stems are respectively connected for the opening of one of said valves upon the closing of the other, inlet supply means communicating with the respective chambers and provided with individual inlet valves, control mechanism connected with the respective inlet valves for the opening and closing thereof independently of each other, snap action mechanism including levers projecting over the respective chambers and over end portions of the lever which connects the outlet valve stems, the snap action levers being adapted to engage with impact the lever first mentioned to reverse the positions of the outlet valves and having connections to the control mechanism for simultaneously opening the inlet valve controlling liquid admission to the chamber in which the outlet valve is closed.

5. In a meter, the combination with a casing having adjacent metering chambers and an intervening partition, of a control head disposed above the partition and provided interiorly with inlet supply passage means having branches leading to the respective chambers and provided with seats, valves disposed in said branches and operatively engageable with the respective seats to control admission of liquid to the respective chambers, valve levers pivoted to said head and operatively connected with said valves for the control of the position thereof, snap action mechanism for the actuation of the respective admission valve levers including control levers projecting over the respective chambers, float assemblies operable in the respective chambers and provided with spaced means engaging said last mentioned levers for the actuation thereof in the rising and falling movement of the respective float assemblies, outlet valves controlling discharge from the respective chambers, a lever pivoted to said head and operatively connected with said outlet valves to open one as the other is closed, said last mentioned lever including impact-receiving means disposed in the path of movement of the respective control levers to be actuated by a control lever in the course of its movement in a direction to open the inlet valve, whereby simultaneously to close the outlet valve of the chamber into which the inlet valve is open and concurrently to open the outlet valve of the other of said chambers.

6. In a device of the character described, the combination with an inlet control head having a plurality of valve seats, of valves operatively associated with the respective seats and provided with projecting stems, bifurcated bell crank levers having spaced arms pivoted to opposite sides of the head and having means in operative connection with the stems of the respective valves, bifurcated control levers having arms pivoted to opposite sides of the head and finger portions associated in toggle link relation to the arms of the respective bell crank levers, said bifurcated control levers also having arms extending oppositely from said fingers, tension springs connected in pairs at opposite sides of the head from the oppositely projecting arms of the bifurcated control levers to the respective bell crank levers for completing with snap action movement initiated in the control levers in either direction for the opening and the closing of said valves.

7. The device of claim 6 in combination with an outlet valve lever, a set of outlet valves respectively connected with opposite ends of the outlet valve lever, said outlet valve lever having means disposed in the path of snap action movement of the respective control levers to receive actuating impact therefrom.

8. In a meter, the combination with a chambered casing providing a partition between chambers and having outlet valve seats, of a unitary control set comprising a control head mounted above said partition and provided with inlet passages leading to the respective chambers and having valve seats, inlet valves operatively associated with the respective seats and having projecting stems, levers pivotally mounted on said head and in operative connection with the respective stems, control levers in toggle link relation to the inlet valve levers, tension springs spanning the toggle link connection between the respective control levers and the respective inlet valve levers for completing with snap action the movement initiated by said control levers, outlet valves operatively associated with the outlet valve seats and provided with stems extending into the proximity of said head, a lever pivoted to said head and provided at its ends with connections to said outlet valve stems, said last named lever having impact-receiving means disposed in the path of snap action movement of the respective control levers, and float assemblies provided with guide means guiding them for operation in the respective chambers, each such assembly having spaced means engageable with one of said control levers for the operation thereof.

9. The device of claim 8 in which each of the several levers aforesaid has portions pivoted to opposite sides of said head.

10. A device of the character described, comprising the combination with a meter chamber provided with an upright guide, of a float assembly reciprocable and rotatable upon said guide and a valve mechanism control set including a lever projecting at one side of the float assembly, and means spaced upon said float assembly above and below the lever and constituting means for the actuation of the lever, said float assembly being rotatable upon contact with and movement of the lever to accommodate change in relative position between the lever and the guide in the course of lever oscillation.

11. In a meter, the combination with a unitary control mechanism, of a casing providing a partition beneath said mechanism and chambers at either side thereof, each of said chambers being constricted adjacent said partition and provided with an enlargement remote therefrom and having float mechanism operating in the enlarged portion in operative relation to said control mechanism, said control mechanism including levers projecting through the constricted portions of the respective chambers into the path of operation of the respective float mechanisms into enlarged portions of said chambers.

12. As a new article of manufacture, a meter casing having the shape of a dumbbell in plan, said casing having a constricted central portion with a transverse central partition of less height than the casing and enlarged portions remote therefrom, the constricted and enlarged portions of the casing all being in communication above the partition.

13. The device of claim 12 in combination with a closure for said casing, a unitary liquid supply and control head disposed above said partition and within said closure, float means operable in the enlarged portions of the casing, and control mechanism on said head including levers projecting through the constricted portions of the casing into the paths of movement of the respective float means to be actuated thereby.

14. The device of claim 12 in combination with a closure for said casing, a unitary control set mounted within said closure upon said partition and provided with a register, said closure having a window centrally disposed above said register and said control set having control levers projecting through the constricted portions of the casing into the enlarged portions thereof, said casing having float means in said enlarged portions in operative relation to the respective levers.

15. In a meter, the combination with a casing having a constricted central portion and enlarged terminal portions and an intervening partition dividing said constricted central portion and defining separate chambers each constricted adjacent said partition and enlarged remote therefrom, outlet valve seats in the bottoms of the restricted portions of said chambers, a closure for said casing, guide rods extending from the bottoms of the enlarged portions of the chambers to the superimposed top of said closure, float assemblies operable upon the respective guide means and substantially filling the enlarged portions of the respective chambers, lever actuating collars relatively adjustable upon the float assemblies, an inlet valve casing mounted above said partition and provided with separate discharge ports leading to the respective chambers and having valve seats for said ports, valves in said casing in operative association with the respective ports and provided with projecting stems, inlet valve levers connected with the respective stems, control levers pivoted to said casing and projecting through the restricted portions of the respective chambers into operative relation to the actuating collars of the respective float assemblies, snap action means for transmitting motion from the control levers to the inlet valve levers, discharge valves in the respective seats at the bottoms of said chambers and provided with stems extending into proximity to said inlet valve casing, and a discharge valve lever pivoted to said inlet valve casing and connected with the discharge valve stems for actuation thereof in opposite directions, said snap action means comprising means for transmitting snap action movement of said control levers for the actuation of said discharge valve lever, and concurrently actuating one of said inlet valve levers.

WILLIAM F. SCHULTZ.